(12) United States Patent
Hattori et al.

(10) Patent No.: US 11,763,795 B2
(45) Date of Patent: Sep. 19, 2023

(54) VEHICLE SOUND GENERATION DEVICE

(71) Applicant: Mazda Motor Corporation, Hiroshima (JP)

(72) Inventors: Yukifusa Hattori, Aki-gun (JP); Shuhei Otsuki, Aki-gun (JP); Ryuichi Yamada, Aki-gun (JP); Takatoshi Nomura, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 45 days.

(21) Appl. No.: 17/676,827

(22) Filed: Feb. 22, 2022

(65) Prior Publication Data

US 2022/0319491 A1 Oct. 6, 2022

(30) Foreign Application Priority Data

Mar. 31, 2021 (JP) ................. 2021-059253

(51) Int. Cl.
*G10K 15/02* (2006.01)
*B60Q 9/00* (2006.01)
(Continued)

(52) U.S. Cl.
CPC .............. *G10K 15/02* (2013.01); *B60Q 9/00* (2013.01); *H04R 5/02* (2013.01); *H04S 3/008* (2013.01);
(Continued)

(58) Field of Classification Search
CPC ...... G10K 15/02; H04R 5/02; H04R 2499/13; H04S 3/008; H04S 7/30; H04S 2400/01; H04S 2400/11
See application file for complete search history.

(56) References Cited

U.S. PATENT DOCUMENTS 9,573,523 B2 2/2017 Di Censo et al.
2013/0216054 A1 8/2013 Inoue
(Continued)

FOREIGN PATENT DOCUMENTS

CN 108860023 A * 11/2018 ......... B60R 11/0217
EP 3621066 A1 3/2020
(Continued)

OTHER PUBLICATIONS

Extended European search report dated Jul. 4, 2022, in corresponding European patent Application No. 22155110.4, 8 pages.

*Primary Examiner* — David L Ton
(74) *Attorney, Agent, or Firm* — XSENSUS LLP

(57) ABSTRACT

A vehicle sound generation device includes a controller that generates a sound signal representing a sound and sets the localization of the sound, and left and right front speakers and left and right rear speakers that output sounds corresponding to the sound signals for which localization has been set by the controller, in which the controller sets the localization of the sounds based on the change amounts (such as the pitch rate, the torque change amount, the roll rate, and steering angular speed) per unit time of the physical quantities correlated with a driving operation by the driver of the vehicle so that the sound image of at least part (low frequency component) of frequency components of the sound is located toward the wheel where the ground load is increasing according to the driving operation.

20 Claims, 12 Drawing Sheets

(51) Int. Cl.
*H04R 5/02* (2006.01)
*H04S 3/00* (2006.01)
*H04S 7/00* (2006.01)

(52) U.S. Cl.
CPC ............ *H04S 7/30* (2013.01); *H04R 2499/13* (2013.01); *H04S 2400/01* (2013.01); *H04S 2400/11* (2013.01)

(56) References Cited

U.S. PATENT DOCUMENTS

| | | | |
|---|---|---|---|
| 2020/0101896 A1* | 4/2020 | Bastyr | B60Q 9/00 |
| 2021/0274303 A1* | 9/2021 | Tanaka | G10L 21/028 |
| 2021/0343268 A1* | 11/2021 | Loh | H04R 3/00 |
| 2022/0185179 A1* | 6/2022 | Kim | G10K 15/02 |

FOREIGN PATENT DOCUMENTS

| | | | | |
|---|---|---|---|---|
| EP | 3664079 B1 * | 1/2022 | | A63G 31/16 |
| JP | 2007-10810 A | 1/2007 | | |
| JP | 2013-167851 A | 8/2013 | | |
| WO | WO-2017169779 A1 * | 10/2017 | | B60W 50/14 |

\* cited by examiner

FIG. 8A

|  | $\omega r < -\omega r0$ | $-\omega r0 \leq \omega r \leq \omega r0$ | $\omega r0 < \omega r$ |
|---|---|---|---|
| $\omega p0 < \omega p$ | FrL +15dB | FrL, FrR +15dB | FrR +15dB |
| $-\omega p0 \leq \omega p \leq \omega p0$ | FrL, RrL +15dB | +0dB | FrR, RrR +15dB |
| $\omega p \leq -\omega p0$ | RrL +15dB | RrL, RrR +15dB | RrR +15dB |

FIG. 8B

|  | $\omega s < -\omega s0$ | $-\omega s0 \leq \omega s \leq \omega s0$ | $\omega s0 < \omega s$ |
|---|---|---|---|
| $\Delta T < -\Delta T0$ | FrL +15dB | FrL, FrR +15dB | FrR +15dB |
| $-\Delta T0 \leq \Delta T \leq \Delta T0$ | FrL, RrL +15dB | +0dB | FrR, RrR +15dB |
| $\Delta T0 < \Delta T$ | RrL +15dB | RrL, RrR +15dB | RrR +15dB |

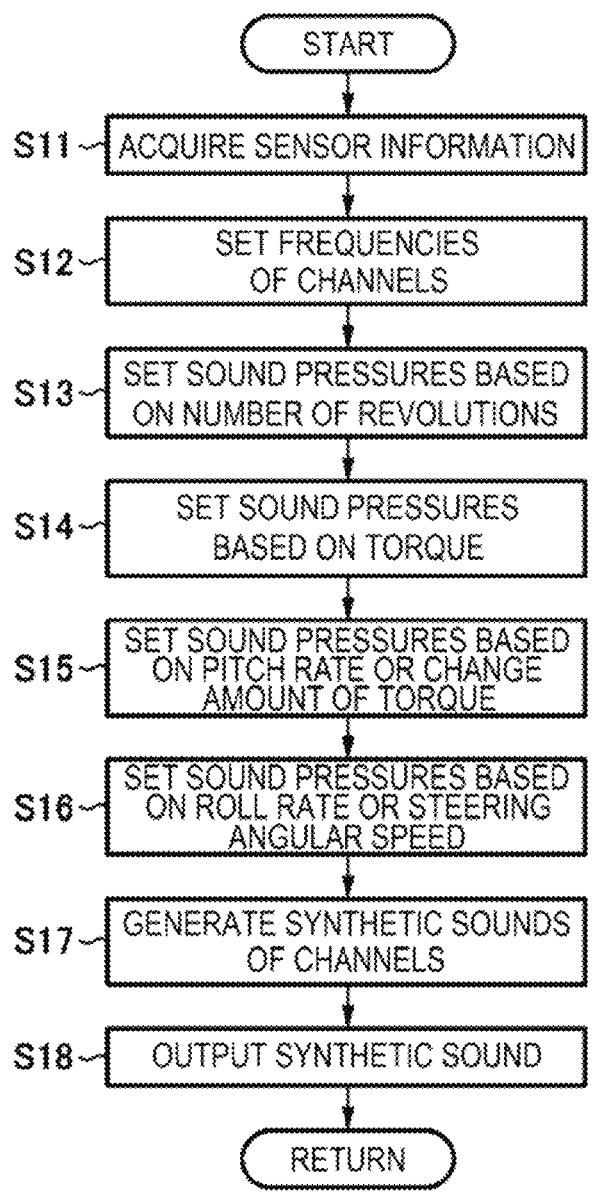

VEHICLE SOUND GENERATION DEVICE

CROSS-REFERENCE TO RELATED APPLICATION

The present application claims priority to Japanese Patent Application 2021-059253, filed Mar. 31, 2021, the entire contents of which are incorporated herein by reference.

BACKGROUND

Field

The present disclosure relates to a vehicle sound generation device and, more particularly, to a vehicle sound generation device that outputs a predetermined sound while a vehicle is traveling.

Description of the Related Art

There is a known conventional technique that outputs a pseudo engine sound or a motor sound toward a driver according to the operating condition of a vehicle such as the vehicle speed or the driving operation by the driver such as the accelerator opening (see, for example, patent document 1 and the patent document 2).

The control device for the vehicle internal sound field described in patent document 1 produces engine sounds produced through a plurality of speakers by controlling the signal processing of sound field control means according to the operating state, and the sound fields of the engine sounds are controlled according to the operating condition. This generates vivid engine sounds that reflect the operating condition in the vehicle interior.

In addition, the vehicle active sound effect generation device described in patent document 2 produces the sound effect that reflects the operational state of the accelerator pedal by the driver, for example, outputs the sound effect that takes the time difference between the intake sound and the exhaust sound into account or produces a feeling of the movement of a sound source by adding a delay to the sound effects output from the rear speakers according to the change amount per unit time of the accelerator opening or the accelerator opening itself.

PRIOR ART DOCUMENTS

Patent Documents

[Patent document 1] JP-A-2007-10810
[Patent document 1] JP-A-2013-167851

SUMMARY

Technical Problems

The techniques of the patent documents described above only reproduce sound originally generated by the vehicle, such as the engine sound, so the driver cannot perceive changes in the force applied to the vehicle.

The present disclosure addresses such a problem with an object of providing a vehicle sound generation device that helps the driver to perceive changes in the force applied to a vehicle and thereby improves the accuracy of a driving operation.

Means for Solving the Problems

To achieve the object described above, according to the present disclosure, there is provided a vehicle sound generation device mounted in a vehicle, including: a sound control unit that generates a sound signal representing a sound and sets localization of the sound; and a sound output unit that outputs a sound corresponding to the sound signal for which localization is set by the sound control unit, in which the sound control unit sets the localization of the sound based on a change amount per unit time of a physical quantity correlated with a driving operation by a driver of the vehicle so that a sound image of at least a part of frequency components of the sound is located toward a wheel where a ground load increases according to the driving operation.

According to the present disclosure configured as described above, the sound image position of the at least a part of the frequency components of the sound is moved toward the wheel where the ground load increases according to a driving operation by the driver based on the change amount per unit time of the physical quantity correlated with the driving operation. This can easily make the driver perceive the load movement of the vehicle by movement of the sound image position of the sound when the load movement occurs according to the driving operation. That is, it is possible to help the driver to perceive changes in the force applied to the vehicle and thereby improve the accuracy of a driving operation.

In addition, in the present disclosure, preferably, the sound control unit sets the localization of the sound so that a position of the sound image is not biased in a particular direction with respect to the driver when the change amount per unit time of the physical quantity correlated with the driving operation is equal to or less than a predetermined value.

According to the present disclosure configured as described above, when, for example, the driver holds the steering wheel and the accelerator pedal in a constant state and load movement in a specific direction does not occur in the vehicle or load movement is sufficiently small even if it occurs, since the sound image position is not biased in a specific direction with respect to the driver, the driver can more easily perceive the movement of the sound image position if the load movement occurs, and the driver can easily recognize that the sounds output from the sound output unit are the sounds regarding the load movement of the vehicle.

In addition, in the present disclosure, preferably, the vehicle travels using a rotational power source including an electric motor and/or an engine and the sound control unit generates a synthetic sound signal including a plurality of frequencies and sets the localization of the sound so that a sound image of a frequency component other than the at least a part of frequency components is located toward the rotational power source.

According to the present disclosure configured as described above, the driver can easily distinguish the sound that reports the state of the rotational power source from the sound regarding the load movement of the vehicle based on the change in the direction of arrival of the sounds.

In addition, in the present disclosure, preferably, the at least a part of frequency components for which localization is set based on the change amount per unit time of the physical quantity correlated with a driving operation by the driver is lower than the frequency component other than the at least a part of frequency components.

According to the present disclosure configured as described above, the sound image position of a low-pitch sound that gives weight and strength is moved toward the wheel where the ground load increases in the embodiment, so the driver can more easily perceive the movement of the load of the vehicle.

In addition, in the present disclosure, preferably, the vehicle travels using a rotational power source including an electric motor and/or an engine, the physical quantity correlated with the driving operation includes an output torque of the rotational power source, and the sound control unit sets the localization of the sound in a front-rear direction of the vehicle based on a change amount per unit time of the output torque.

According to the present disclosure configured as described above, control is performed using the acceleration of the vehicle and the output torque of the rotational power source that changes before the suspension stroke, so the driver can perceive the movement of the sound image position of the low-pitch sound before the behavior in the front-rear direction of the vehicle changes, thereby helping the driver to predict the behavior change in the front-rear direction of the vehicle.

In addition, in the present disclosure, preferably, the physical quantity correlated with the driving operation includes a steering angle of the vehicle, and the sound control unit sets the localization of the sound in a left-right direction of the vehicle based on a change amount per unit time of the steering angle.

According to the present disclosure configured as described above, control is performed using the acceleration of the vehicle and the steering angle that changes before the suspension stroke, so the driver can perceive the movement of the sound image position of the low-pitch sound before the behavior in the left-right direction of the vehicle changes, thereby helping the driver to predict the behavior change in the left-right direction of the vehicle.

Advantages

The vehicle sound generation device according to the disclosure helps the driver to perceive the change of the force applied to the vehicle and thereby improves the accuracy of the driving operation.

BRIEF DESCRIPTION OF THE DRAWINGS

FIG. 8A is a table illustrating an example of equalizing processing of the sound generation processing according to the first embodiment of the present disclosure.

FIG. 8B is a table illustrating another example of the equalizing processing of the sound generation processing according to the first embodiment of the present disclosure.

FIG. 10 is a flowchart illustrating the sound generation processing according to the second embodiment of the present disclosure.

DESCRIPTION OF EMBODIMENTS

A first embodiment and a second embodiment of the present disclosure will be described below with reference to the attached drawings. It should be noted that, when these embodiments do not need to be distinguished from each other, simply the "embodiment" is used. In contrast, when these embodiments need to be distinguished from each other, the "first embodiment" or the "second embodiment" is used.

Figure 1:
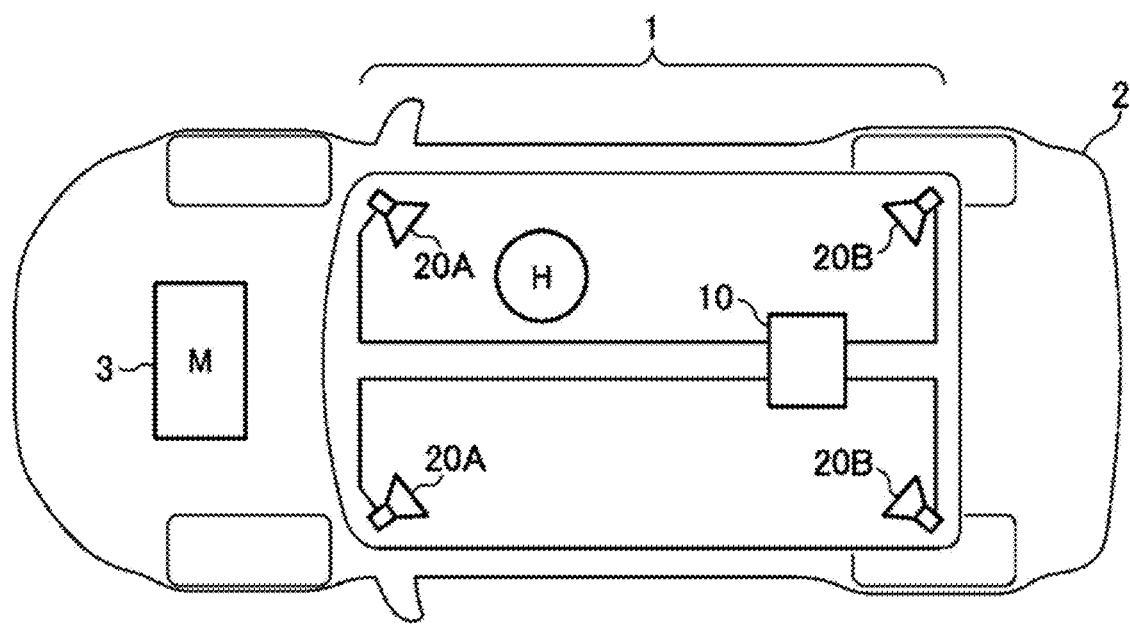
FIG. 1 is an explanatory diagram of a vehicle sound generation device according to an embodiment of the present disclosure.

First, the structure of a vehicle sound generation device according to the present disclosure will be described with reference to FIGS. 1 and 2. FIG. 1 is an explanatory diagram of the vehicle sound generation device and FIG. 2 is a structural diagram of the vehicle sound generation device.

Figure 2:
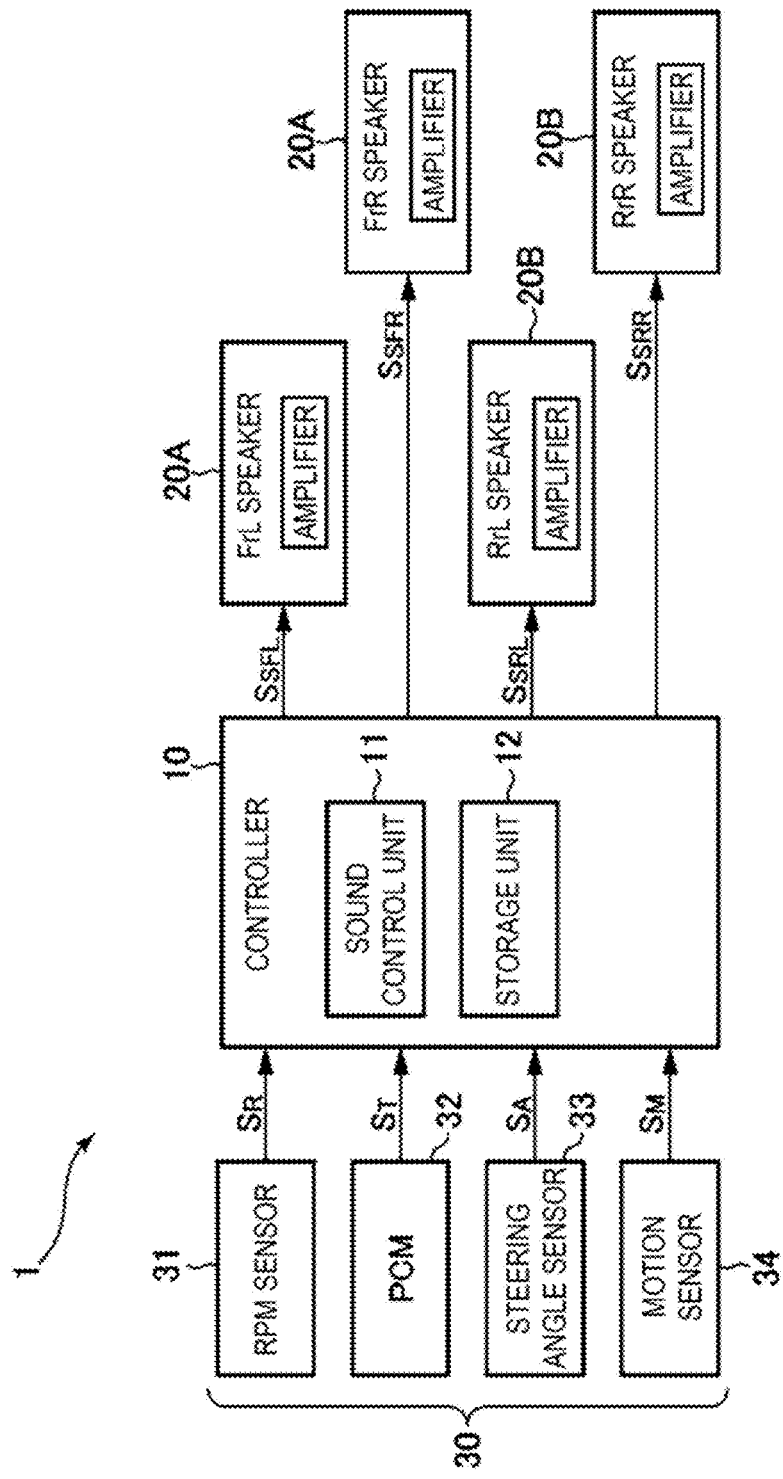
FIG. 2 is a structural diagram of the vehicle sound generation device according to the embodiment of the present disclosure.

As illustrated in FIGS. 1 and 2, the vehicle sound generation device 1 according to the embodiment includes a controller 10 mounted in a vehicle 2, left and right front speakers 20A that output sounds toward the driver seat from the front of the driver seat in the vehicle interior, left and right rear speakers 20B that output sounds toward the driver seat from the rear of the driver seat, and a sensor group 30 including various sensors that detect the states of the vehicle 2.

The vehicle 2 is a vehicle that travels using a rotational power source including an electric motor, an engine, or the like. In the present embodiment, the vehicle 2 is an electric vehicle (EV) having an electric motor 3, but the vehicle 2 is not limited to this example and may be a hybrid vehicle having both an internal combustion engine and an electric motor or may be a vehicle having only an internal combustion engine.

The controller 10 is a computer device including a processor, a memory (storage unit 12) for storing various programs, a data input-output device, and the like. The controller 10 is communicably connected to other in-vehicle devices via an in-vehicle communication line. The controller 10 outputs sound signals to the front speakers 20A and the rear speakers 20B by causing the processor to execute a program based on vehicle information from the sensor group 30. At that time, the processor of the controller 10 functions as a sound control unit 11 as described below.

The front speakers 20A and the rear speakers 20B are sound output units having amplifiers. The front speakers 20A and the rear speakers 20B receive the sound signals from the controller 10, amplify the sound signals at a predetermined amplification factor, and output sounds based on the sound signals. It should be noted that the front speakers 20A and the rear speakers 20B do not need to be provided in the vehicle interior as long as the sounds generated by the front speakers 20A and the rear speakers 20B can be localized with respect to the driver. Although the front speakers 20A include a pair of left and right speakers FrL and FrR and the rear speakers 20B include a pair of left and right speakers RrL and RrR in the embodiment, the front speakers 20A and the rear speakers 20B may include more speakers.

The sensor group 30 includes an RPM sensor 31 that detects the number of revolutions of the electric motor 3, a PCM 32 that controls the electric motor 3, a steering angular sensor 33 that detects the steering angle of the vehicle 2 (including the steering angle of the steering wheel and the actual steering angle of steered wheels), and a motion sensor 34 (for example, a 3D gyro sensor) that detects at least the pitch rate and the roll rate of the vehicle 2. The sensor group 30 transmits signals indicating the detected vehicle information through the in-vehicle communication line. The controller 10 can receive various vehicle information signals from the sensor group 30 via the in-vehicle communication line.

The vehicle information signals include a motor RPM signal $S_R$, a motor torque value signal $S_T$, a steering angle signal $S_A$, and a posture angle signal $S_M$. The controller 10 (processor) reads the number of revolutions R of the motor from the motor RPM signal $S_R$, reads the motor torque value T from the motor torque value signal $S_T$, reads a steering angular speed ωs from the steering angle signal $S_A$, and reads a pitch rate ωp and a roll rate ωr from the posture angle signal $S_M$. The motor torque value T is the motor torque value (or the target motor torque value) required for the electric motor 3. It is assumed that the steering angular speed ωs is positive when the steering wheel is operated counterclockwise in the embodiment. It is also assumed that the pitch rate ωp is positive when the vehicle 2 pitches forward. It is also assumed that the roll rate ωr is positive when the vehicle 2 rolls to the right.

The PCM 32 is a computer device including a processor, a memory for storing various programs, a data input-output device, and the like as in the controller 10. The PCM 32 receives a vehicle speed signal, an accelerator opening signal, and other signals via the in-vehicle communication line. The PCM 32 calculates the target acceleration based on the current accelerator opening and the like by using an acceleration characteristic map (stored in the memory of the PCM 32) that defines the relationship between the accelerator opening and gears (or the accelerator opening and the change rate (accelerator depression speed) thereof, gears, and the like) thereof and the target acceleration. In addition, the PCM 32 calculates the required motor torque value (or the target motor torque value) for achieving the target acceleration.

It should be noted that the motor torque value T is the motor torque value required for the electric motor 3 in the embodiment, but the motor torque value T is not limited to this and may be the actual motor torque value that is actually output by the electric motor 3. However, use of the required motor torque value rather than the actual motor torque value can provide sound output to the driver more quickly in response to an accelerator operation by the driver, so greater contribution to improvement of drivability can be expected. It is preferable to use the required motor torque value rather than the actual motor torque value in this respect.

In addition, although the controller 10 receives the motor torque value signal $S_T$ from the PCM 32 in the embodiment, this is not necessarily required and the controller 10 may calculate the motor torque value T based on the accelerator opening or the like using the acceleration characteristic map or the like.

Figure 3A:
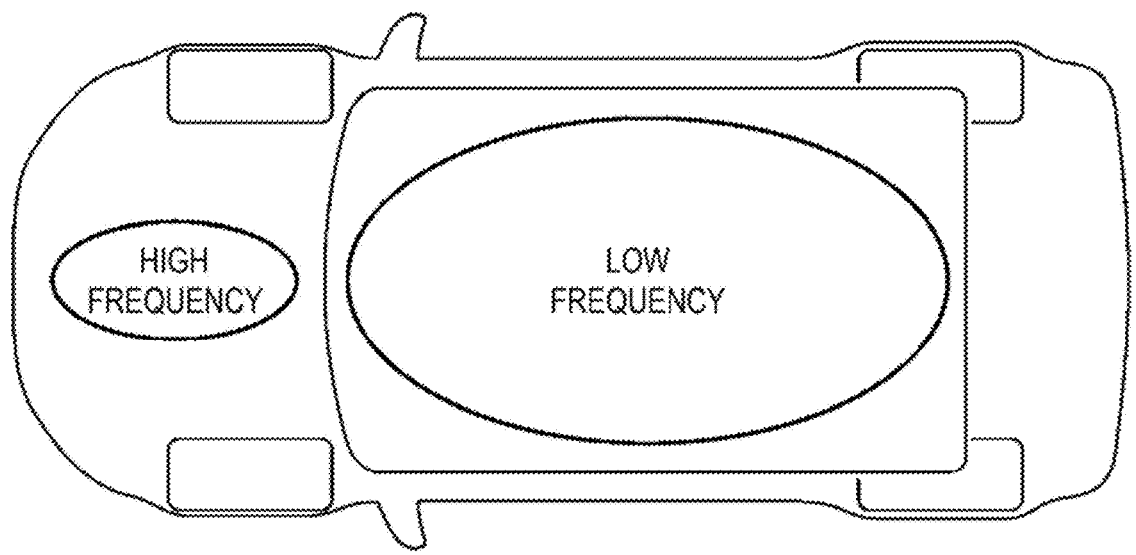
FIG. 3A is an explanatory diagram illustrating the basic concept of control by the vehicle sound generation device according to the embodiment of the present disclosure.
Figure 3B:
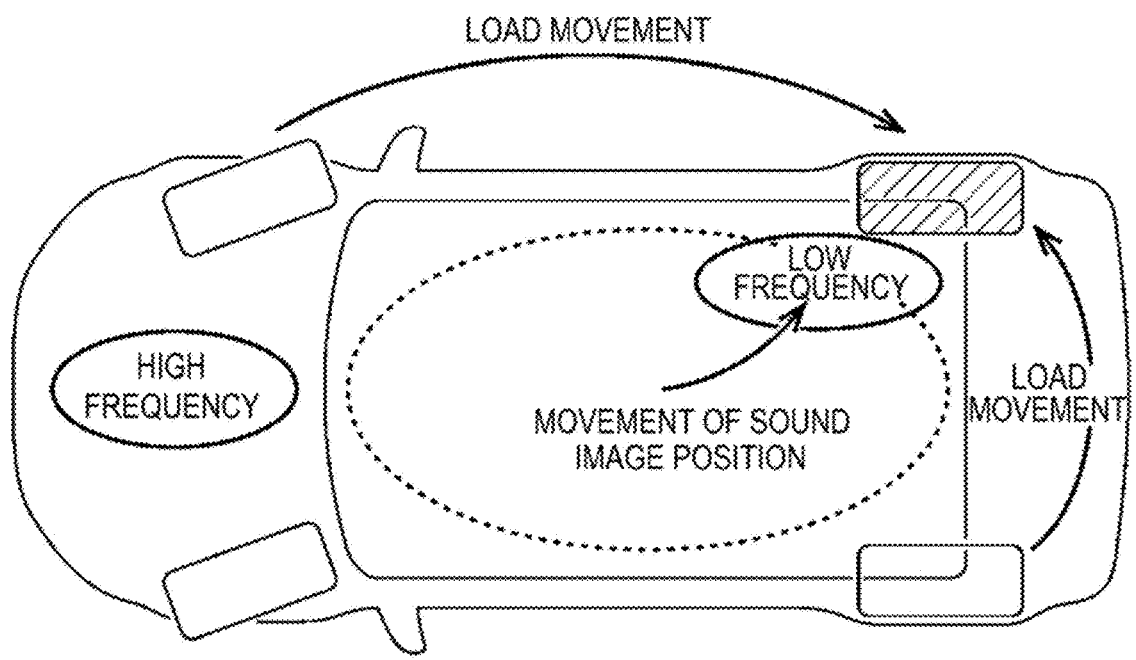
FIG. 3B is an explanatory diagram illustrating the basic concept of control by the vehicle sound generation device according to the embodiment of the present disclosure.

Next, control by the vehicle sound generation device 1 according to the embodiment will be described with reference to FIGS. 3A and 3B. FIGS. 3A and 3B are explanatory diagrams illustrating the basic concept of control by the vehicle sound generation device 1 according to the embodiment. In FIGS. 3A and 3B, the positions and ranges of the ellipses conceptually represent the sound image positions with respect to the driver. In addition, the dotted ellipse represents the state before the sound image positions or the sound pressure levels change and the solid ellipses represent the state after the sound image positions or the sound pressure levels change.

When the vehicle 2 is accelerated from the state in which the vehicle 2 stops or is traveling at a constant speed, the inertial force acts on the center of gravity of the vehicle 2, thereby reducing the load on the front wheels and increasing the load on the rear wheels. That is, the load movement from the front wheels to the rear wheels occurs. In addition, when the vehicle 2 starts turning from a straight-ahead travel, the inertial force acts on the center of gravity of the vehicle 2, thereby reducing loads on the turning inner wheels and increasing loads on the turning outer wheels. In these cases, the driver can perceive that the vehicle 2 has started accelerating or turning, but cannot easily perceive the change rate (jerk) of the acceleration and the movement of loads only by the equilibrium sense of the body. Accordingly, in the embodiment, the vehicle sound generation device 1 helps the driver to perceive changes in the force applied to the vehicle by controlling the localization of the sound image of sounds output from the front speakers 20A and the rear speakers 20B so as to change the direction of arrival of the sounds according to the load movement of the vehicle 2.

Specifically, the controller 10 generates the synthetic sound including sounds with a plurality of frequencies and outputs this synthetic sound to the driver through the left and right front speakers 20A and the left and right rear speakers 20B. When the change amount (such as, for example, the pitch rate, the torque change amount, or the forward or backward jerk regarding the front-rear direction of the vehicle 2 or the roll rate, the steering angular speed, or the left or right jerk regarding the left-right direction of the vehicle 2) per unit time of the physical quantity (for example, the physical quantity correlated with a driving operation regarding the front-rear direction of the vehicle 2 includes the pitch angle, the motor torque value, the forward and backward accelerations, and the like, and the physical quantity correlated with a driving operation regarding the left-right direction includes the roll angle, the steering angle, the left and right accelerations, and the like) correlated with the driving operation by the driver is equal to or less than a predetermined value, that is, when load movement in a particular direction does not occur or load movement is sufficiently small even if it occurs, the controller 10 outputs the low frequency component of the synthetic sound that gives weight and strength through the front speakers 20A and the rear speakers 20B so that the sound image position thereof is not biased in a specific direction (that is, the low-pitch sound that gives weight and strength is heard in the surroundings of the driver without bias) with respect to the driver. For example, when the difference among the sound pressure levels in the front, the back, the left, and the right of the headrest of the driver seat is less than 4 dB, it can be said that the sound image position is not biased. In addition, the controller 10 sets (for example, reduces the sound pressure level of the high frequency component output from the rear speakers 20B) the localization of the front speakers 20A and the rear speakers 20B so that the sound image position of the high frequency component of the synthetic sound is located toward the electric motor 3 (that is, the high-pitch sound is heard from the front of the driver.

FIG. 3A illustrates the state in which the vehicle 2 steadily travels at a constant vehicle speed or the vehicle 2 continuously accelerates at a constant acceleration. In this case, the ground load of each of the wheels of the vehicle 2 is constant and the load movement in a specific direction does not occur. Accordingly, the controller 10 outputs the low frequency component of the synthetic sound that gives weight and strength through the front speakers 20A and the rear speakers 20B so that the sound image position thereof is not biased in a specific direction with respect to the driver.

On the other hand, for example, when the vehicle 2 is traveling on a left curve, if the driver starts acceleration by depressing the accelerator pedal while turning the steering wheel to the left, the ground load of the right rear wheel increases (that is, the load movement to the right rear wheel occurs) in the vehicle 2 as shown in FIG. 3B. In this case, when the change amount per unit time of the physical quantity correlated with the driving operation of the driver of the vehicle 2 is more than the predetermined value, the controller 10 increases the sound pressure level of the low frequency component output through the right rear speaker 20B so that the sound image position of the low frequency component that gives weight and strength among the synthetic sound is located toward the wheel (here, the right rear wheel) where the ground load is increasing (that is, so that the driver feels that the source of generation of the low frequency component of the synthetic sound is located toward the right rear wheel). By moving the sound image position of the low-pitch sound that gives weight and strength toward the wheel where the ground load is increasing, the driver can perceive that the load of the vehicle 2 is moving. It should be noted that not only the low frequency component of the synthetic sound, but also the sound image positions of all the components of the synthetic sound may be moved toward the wheel where the ground load is increasing. Alternatively, the controller 10 may produce a single-frequency sound and move the sound image position of this sound toward the wheel where the ground load is increasing.

Figure 4:
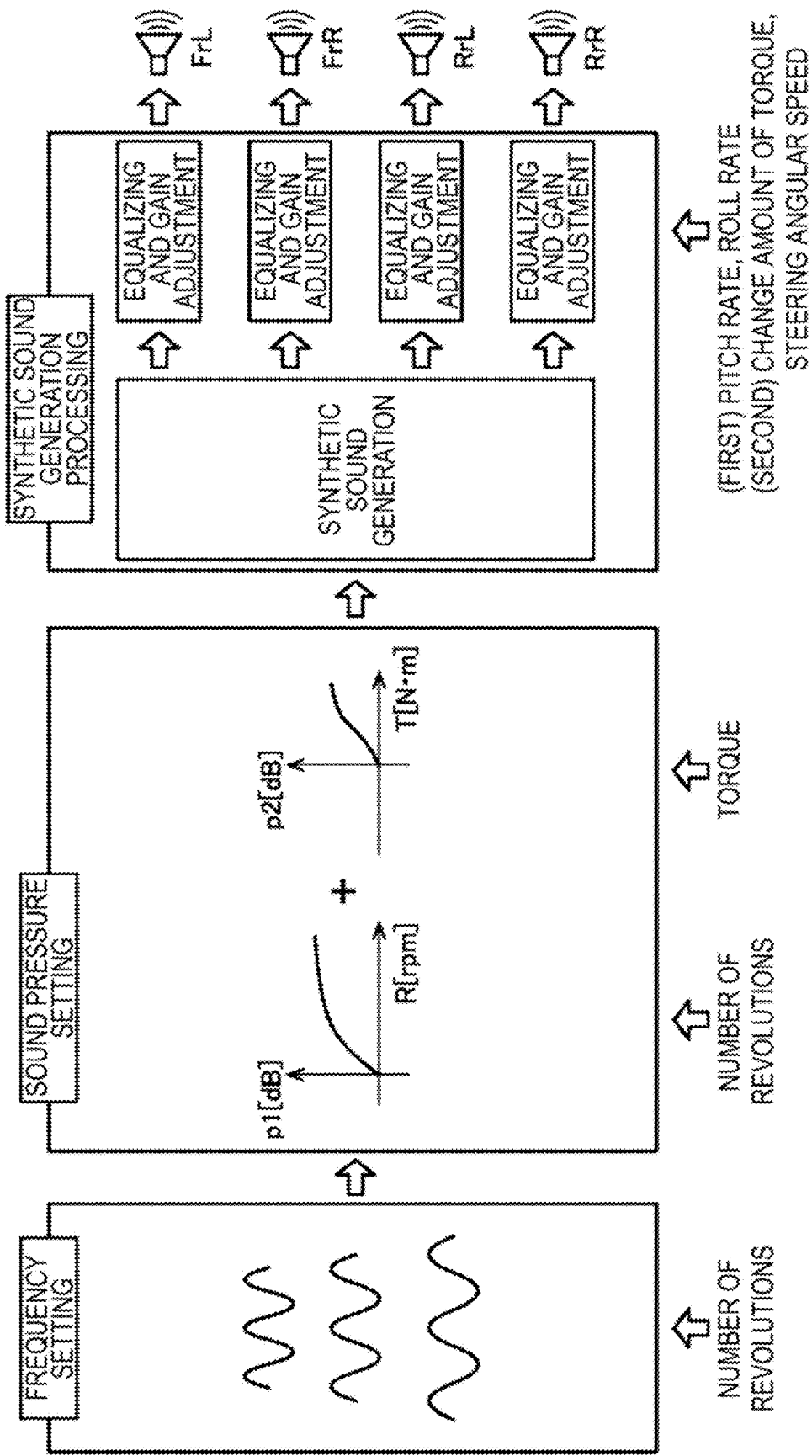
FIG. 4 is the explanatory diagram illustrating a flow of sound generation processing by a vehicle sound generation device according to a first embodiment of the present disclosure.

Next, a flow of the sound generation processing by the vehicle sound generation device 1 according to the first embodiment will be described with reference to FIG. 4. FIG. 4 is an explanatory diagram illustrating a flow of the sound generation processing by the vehicle sound generation device 1 according to the first embodiment.

As illustrated in FIG. 4, the vehicle sound generation device 1 according to the first embodiment first sets a plurality of frequencies in the sound generation processing based on the number of revolutions R of the motor (frequency setting). The frequencies are set so as to be proportional to the number of revolutions R of the motor. That is, the frequencies become higher as the number of revolutions R of the motor increases.

Next, the vehicle sound generation device 1 sets the sound pressure levels of the set frequencies based on the number of revolutions R of the motor and the motor torque value (sound pressure setting). Specifically, the vehicle sound generation device 1 sets the first sound pressure level p1 corresponding to the number of revolutions R of the motor for each of the frequencies with reference to a first sound pressure level setting map that defines the relationship between the number of revolutions R of the motor and the sound pressure level and sets the second sound pressure level p2 corresponding to the motor torque value for each of the frequencies with reference to a second sound pressure level setting map that defines the relationship between the motor torque value and the sound pressure level. Then, the vehicle sound generation device 1 specifies the sum of the first sound pressure level p1 and the second sound pressure level p2 as the sound pressure level of the sound with each of the frequencies. It should be noted that one first sound pressure level setting map and one second sound pressure level setting map are illustrated in FIG. 4, but the first pressure level setting map and the second sound pressure level setting map are prepared in advance for each of the plurality of frequencies and are stored in the storage unit 12.

Next, by synthesizing the sounds with the frequencies for which the sound pressures have been set, the vehicle sound generation device 1 generates synthetic sound signals of a total of four channels: the synthetic sound signals of the front channels for the left and right front speakers 20A and the synthetic sound signals of the rear channels for the left and right rear speakers 20B (synthetic sound generation processing). In the first embodiment, the synthetic sound signals of the channels are generated by synthesizing the sounds of all frequencies set in the sound pressure setting. That is, the synthetic sound signals of the channels at this stage are the same.

Next, the vehicle sound generation device 1 performs the equalizing and gain adjustment on the synthetic sound signals of the channels. At this time, the vehicle sound generation device 1 sets the localization so that the sound image position of the high frequency component is in front of the driver by reducing the sound pressure levels of the high frequency components of the synthetic sound signals of the channels for left and right rear speakers 20B. In addition, the vehicle sound generation device 1 sets that the sound image position of the low frequency components is located toward the wheel where the ground load is increasing by adjusting the sound pressure levels of the low frequency components of the synthetic sound signals of the channels based on the change amount per unit time of the physical quantity correlated with the driving operation of the driver.

Then, the vehicle sound generation device 1 outputs the synthetic sound signal $S_{SFL}$ of the channel for the left front speaker 20A (FrL), the synthetic sound signal $S_{SFR}$ of the channel for the right front speaker 20A (FrR), the synthetic sound signal $S_{SRL}$ of the channel for the left rear speaker 20B (RrL), and the synthetic sound signal $S_{SRR}$ of the channel for the right rear speaker 20B (RrR) after being subject to equalizing and gain adjustment to the corresponding speakers. The speakers 20A and 20B receive the synthetic sound signals, amplify the received signals, and output the amplified signals as the synthetic sounds toward the driver.

Figure 5:
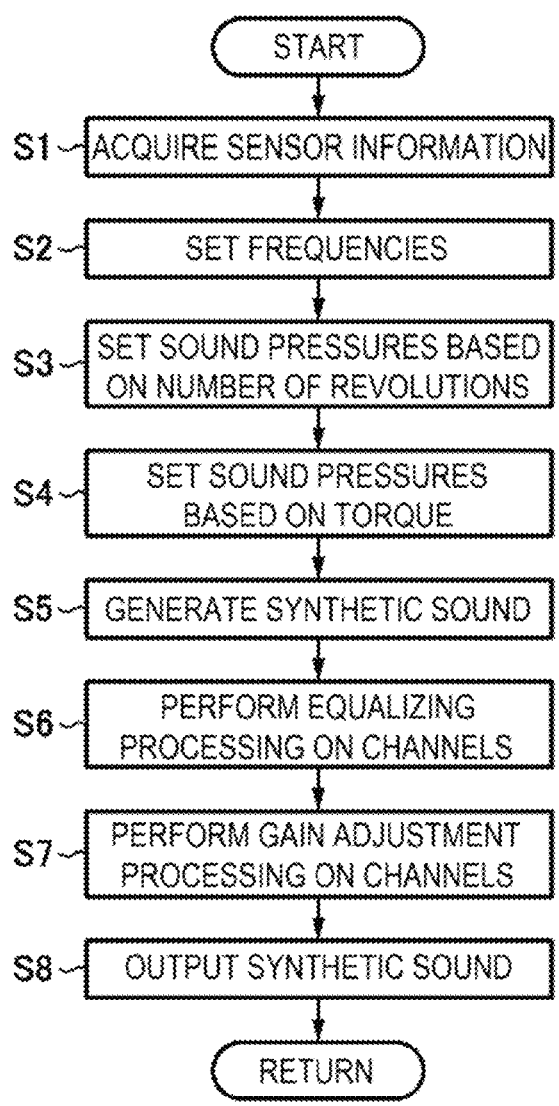
FIG. 5 is a flowchart of the sound generation processing according to the first embodiment of the present disclosure.
Figure 6A:
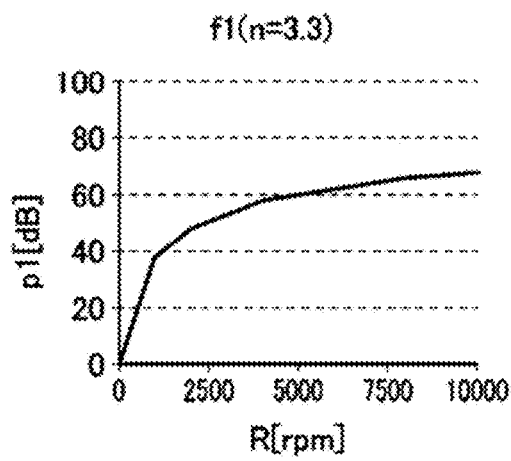
FIGS. 6A, 6B, 6C, 6D and 6E are a first sound pressure level setting map illustrating the relationship between the number of revolutions of a motor and the sound pressure level in the embodiment of the present disclosure.
Figure 6B:
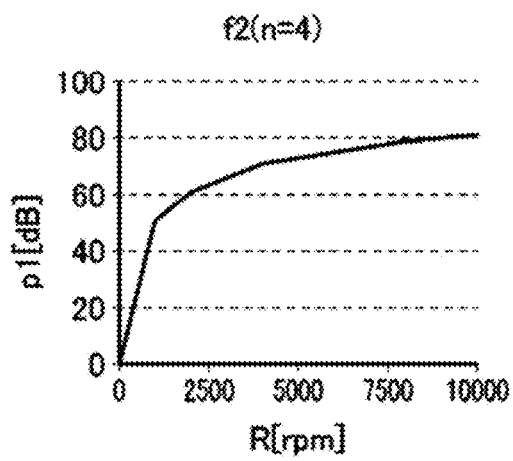
Figure 6C:
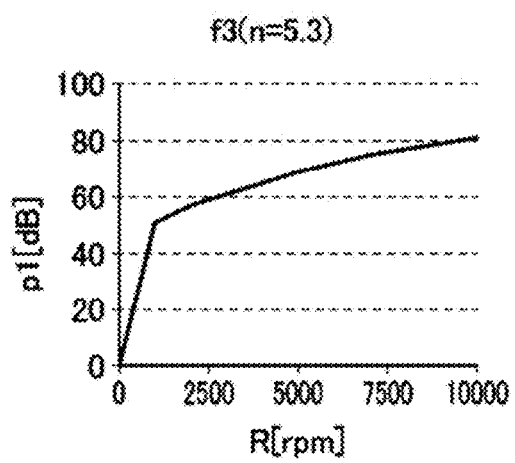
Figure 6D:
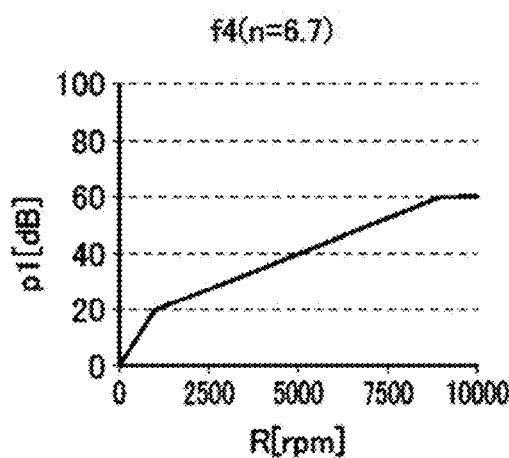
Figure 6E:
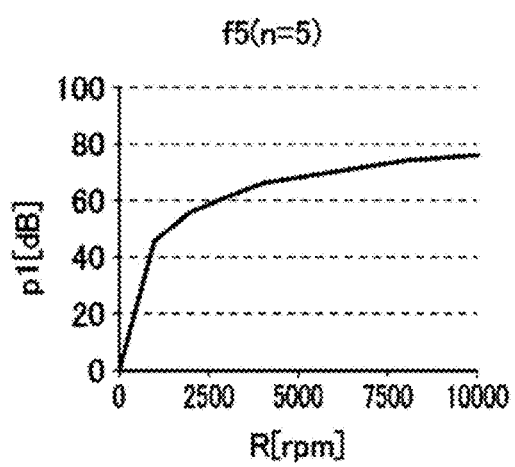
Figure 7A:
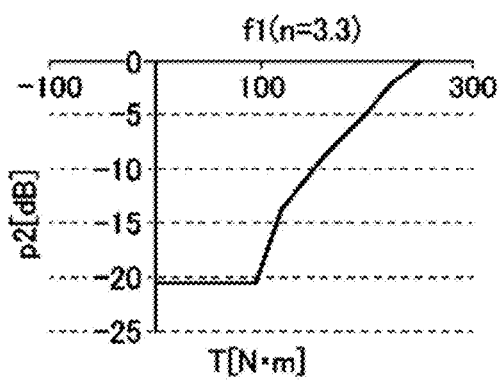
FIGS. 7A, 7B, 7C, 7D and 7E are a second sound pressure level setting map illustrating the relationship between the motor torque value and the sound pressure level in the embodiment of the present disclosure.
Figure 7B:
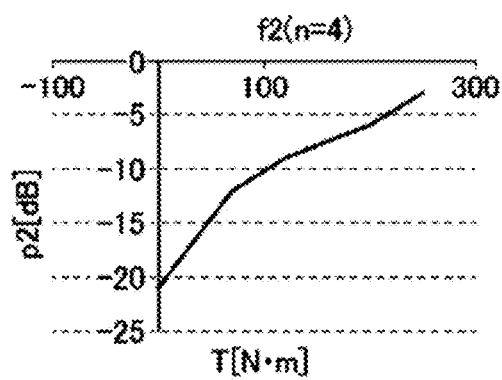
Figure 7C:
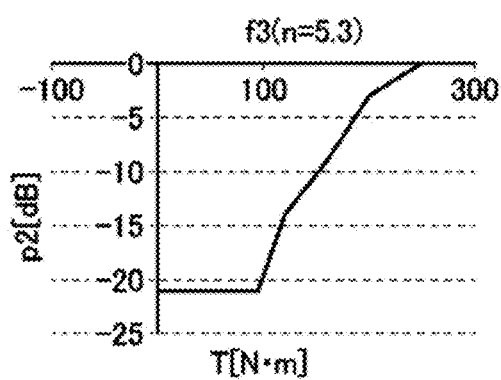
Figure 7D:
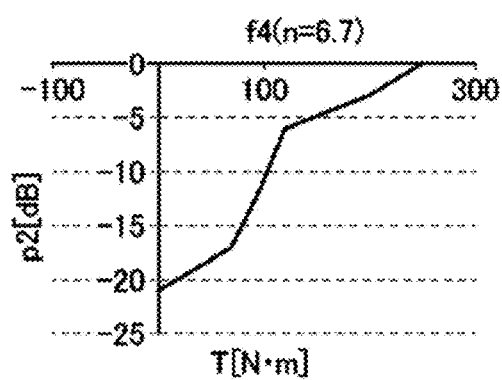
Figure 7E:
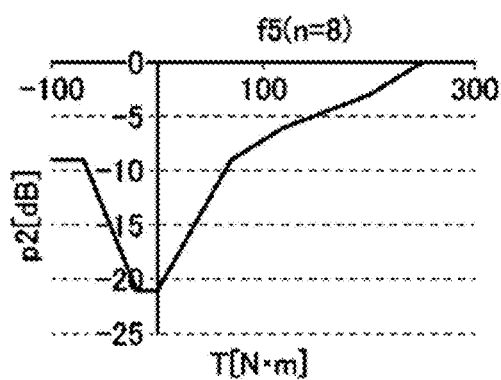

Next, the sound generation processing by the vehicle sound generation device 1 according to the first embodiment will be described with reference to FIGS. 5 to 8. FIG. 5 is a flowchart of the sound generation processing according to the first embodiment, FIGS. 6A, 6B, 6C, 6D and 6E are the first sound pressure level setting map illustrating the relationship between the sound pressure level and the number of revolutions of the motor according to the embodiment, FIGS. 7A, 7B, 7C, 7D and 7E are the second sound pressure level setting map illustrating the relationship between the sound pressure level and the motor torque value according to the embodiment, and FIGS. 8A and 8B are tables illustrating the outline of the equalizing processing in the sound generation processing according to the first embodiment.

The vehicle sound generation device 1 repeatedly executes the sound generation processing illustrated in FIG. 5 at predetermined time intervals (for example, 10 ms intervals).

When the sound generation processing starts, the controller 10 first acquires sensor information from the sensor group 30 via the in-vehicle communication line (step S1). As described above, the controller 10 acquires at least the number of revolutions R of the motor, the motor torque value T, the steering angular speed $\omega s$, the pitch rate $\omega p$, and the roll rate $\omega r$.

Next, the controller 10 (sound control unit 11) performs frequency setting processing (step S2). In the frequency setting processing, the controller 10 sets a plurality of frequencies based on the number of revolutions R of the motor. Specifically, five frequencies f1 to f5 for the number of revolutions R of the motor, which are the primary frequencies (basic frequencies) are set by the following equation.

$$fk\ (Hz) = R\ (Hz) \times nk \qquad \text{(Equation 1)}$$

Where, k is 1 to 5 and nk is the order with respect to the number of revolutions R of the motor. Specifically, for example, n1 is 3.3, n2 is 4, n3 is 5.3, n4 is 6.7, and n5 is 8. For example, a 3.3-order frequency f1 is the frequency (R (Hz)×3.3) that is 3.3 times the number of revolutions R of the motor. It should be noted that the basic frequency is the number of revolutions R of the motor in the embodiment, but the basic frequency is not limited to this and may be a frequency that increases as the number of revolutions R of the motor increases (for example, the basic frequency may increase proportionally to the number of revolutions R of the motor).

For example, when the number of revolutions R of the motor is 50 Hz (3000 rpm), the frequency f1 is 165 Hz, a frequency f2 is 200 Hz, a frequency f3 is 265 Hz, a frequency f4 is 335 Hz, and a frequency f5 is 400 Hz.

Next, the controller 10 (sound control unit 11) sets the first sound pressure level p1 of each of the frequencies based on the number of revolutions R of the motor with reference to the first sound pressure level setting map (also referred to below as the "map M1") stored in the storage unit 12 (step S3). As illustrated in FIGS. 6A, 6B, 6C, 6D and 6E, the map M1 is set for each of the frequencies f1 to f5 of the five orders n1 to n5. The map M1 defines the first sound pressure level p1 (dB) of each of sounds S1 to S5 with the frequencies f1 to f5 for the number of revolutions R (rpm) of the motor.

In the map M1, the first sound pressure level p1 substantially increases as the number of revolutions R of the motor increases. It should be noted that, in the embodiment, the driver can hardly recognize sounds having a sound pressure level lower than 40 dB and can recognize sounds having a sound pressure level (audible sound pressure level) of 40 dB or more as a guide. Accordingly, since, for example, the first sound pressure level p1 is set to less than 30 dB at the frequency f4 when the number of revolutions R of the motor is less than about 2500 rpm in the map M1, the driver cannot hear the sound S4 with the frequency f4 during low speed rotation. Accordingly, the driver cannot consciously hear the sound with a frequency of approximately 30 dB included in a synthetic sound SC. However, such a sound with a frequency of approximately 30 dB may affect a vehicle operation by the driver unconsciously.

Next, the controller 10 (sound control unit 11) sets the second sound pressure level p2 of each of the frequencies f1 to f5 based on the second sound pressure level setting map (also referred to as the "map M2") stored in the storage unit 12 (step S4). As illustrated in FIGS. 7A, 7B, 7C, 7D and 7E, the map M2 is set for each of the frequencies f1 to f5 of the orders n1 to n5. The second sound pressure level p2 (dB) of each of the frequencies f1 to f5 is defined with respect to the motor torque value T (N·m) in the map M2. It should be noted that, in the map M2, a positive motor torque indicates that the electric motor 3 is operating in a power running state and a negative motor torque indicates that the electric motor 3 is operating in a regenerative state.

In the map M2, the second sound pressure level p2 is negative for the frequencies f1 to f5 and the second sound pressure level p2 increases as a positive motor torque value increases. Accordingly, in the embodiment, the first sound pressure level p1 is set based on the number of revolutions R of the motor, and, when the acceleration request (accelerator operation) by the driver is low, a synthetic sound corrected to reduce the pressure level by the second sound pressure level p2 is generated. That is, at the time of acceleration, the larger the number of revolutions R of the motor or the motor torque value T, the larger the output levels of the sounds output by the front speakers 20A and the rear speakers 20B.

Furthermore, in the map M2, for the frequencies f1 and f3, even if the motor torque value T increases from zero, the second sound pressure level p2 does not increase until the amount of increase in the motor torque value T exceeds a predetermined amount. On the other hand, for the frequencies f2, f4, and f5, when the motor torque value T increases from zero, the second sound pressure level p2 increases substantially proportionally to the amount of increase in the motor torque value T without waiting for a predetermined amount of increase. Accordingly, when the driver accelerates the vehicle 2 by operating the accelerator, sounds having lower frequencies f1 and f3 are always emphasized and output. That is, at the time of acceleration, at least the sound in the lowest sound range (k=1) rises quickly and then the sound in a higher sound range (k=2, 4, 5) follows.

Next, the controller 10 (sound control unit 11) sets the sum of the first sound pressure level p1 and the second sound pressure level p2 of the sounds S1 to S5 with the frequencies f1 to f5 as the sound pressure levels of the sounds S1 to S5 with the frequencies f1 to f5, and generates the synthetic sound signal $S_{SFL}$ of the channel for the left front speaker 20A (FrL), the synthetic sound signal $S_{SFR}$ of the channel for the right front speaker 20A (FrR), the synthetic sound signal $S_{SRL}$ of the channel for the left rear speaker 20B (RrL), and the synthetic sound signal $S_{SRR}$ of the channel for the right rear speaker 20B (RrR) by synthesizing the sounds S1 to S5 with the frequencies f1 to f5, to which the sound pressure is set (step S5).

Next, the controller 10 (sound control unit 11) performs equalizing processing individually on the synthetic sound signal $S_{SFL}$ of the channel for the left front speaker 20A (FrL), the synthetic sound signal $S_{SFR}$ of the channel for the right front speaker 20A (FrR), the synthetic sound signal $S_{SRL}$ of the channel for the left rear speaker 20B (RrL), and the synthetic sound signal $S_{SRR}$ of the channel for the right rear speaker 20B (RrR) (step S6).

FIG. 8A illustrates the amount of adjustment when the sound pressure level of the low frequency component of each of the channels based on the pitch rate ωp and the roll rate ωr is adjusted, as an example of the equalizing processing according to the first embodiment. In the example illustrated in FIG. 8A, the controller 10 (sound control unit 11) performs equalizing of the channels based on the change amount per unit time of the physical quantity correlated with a driving operation regarding the front-rear direction of the vehicle 2 and the change amount per unit time of the physical quantity correlated with a driving operation regarding the left-right direction of the vehicle 2 by using the pitch rate ωp as the change amount per unit time of the physical quantity correlated with a driving operation regarding the front-rear direction and using the roll rate ωr as the change amount per unit time of the physical quantity correlated with a driving operation regarding the left-right direction.

For example, when the absolute value of the roll rate ωr is equal to or less than a predetermined value ωr0 (−ωr0≤ωr≤ωr0) and the absolute value of the pitch rate ωp is equal to or less than a predetermined value ωp0 (−ωp0≤ωp≤ωp0), that is, when the roll rate ωr and the pitch rate ωp are sufficiently small and the load movement is sufficiently small in any of the front-rear direction and the left-right direction of the vehicle 2, the controller 10 (sound control unit 11) does not change the sound pressure levels of the low frequency components of the synthetic sound signals of the channels from the setting values in step S5.

In addition, for example, when the roll rate ωr is smaller than a negative predetermined value −ωr0 (ωr<−ωr0, here, when the absolute value of the roll rate in the left direction of the vehicle 2 is larger than the predetermined value ωr0), that is, when the vehicle 2 is turning to the right and the load movement from the right to the left of the vehicle 2 occurs, the controller 10 (sound control unit 11) increases the sound pressure level of the low frequency component in either or both of the synthetic sound signal $S_{SFL}$ of the channel for the left front speaker 20A (FrL) and the synthetic sound signal $S_{SRL}$ of the channel for the left rear speaker 20B (RrL) according to the pitch rate ωp. For example, when the pitch rate ωp is larger than the predetermined value ωp0 (ωp0<ωp, here, when the pitch rate toward the front of the vehicle 2 is larger than the predetermined value ωp0), that is, when the vehicle 2 is decelerating while turning to the right and the load movement from the rear to the front of the vehicle 2 occurs, the controller 10 (sound control unit 11) increases only the sound pressure level of the low frequency component of the synthetic sound signal $S_{SFL}$ of the channel for the left front speaker 20A (FrL). This sets the localization so that the sound image position of the low frequency components of the synthetic sounds output from the front speakers 20A and the rear speakers 20B is located toward the left front wheel when the ground load of the left front wheel of the vehicle 2 is increasing.

Similarly, according to the table illustrated in FIG. 8A, the controller 10 (sound control unit 11) adjusts the sound pressure levels of the low frequency components of the synthetic sound signals of the channels based on the values of the roll rate ωr and the pitch rate ωp. This sets the localization of the synthetic sound signals so that the sound image of the low frequency components of the synthetic sound output from the front speakers 20A and the rear speakers 20B is located toward the wheel where the ground load is increasing.

In addition, in another example of the equalizing processing according to the first embodiment, as illustrated in FIG. 8B, the controller 10 (sound control unit 11) performs the equalizing of the channels based on the change amount per unit time of the physical quantity correlated with a driving operation regarding the front-rear direction of the vehicle 2 and the change amount per unit time of the physical quantity correlated with a driving operation regarding the left-right direction of the vehicle 2 by using the change amount ΔT of the motor torque value T as the change amount per unit time of the physical quantity correlated with a driving operation regarding the front-rear direction and using the steering angular speed ωs as the change amount per unit time of the physical quantity correlated with a driving operation regarding the left-right direction. Even in this case, according to the table illustrated in FIG. 8B, the controller 10 (sound control unit 11) adjusts the sound pressure levels of the low frequency components of the synthetic sound signals of the channels based on the values of the steering angular speed ωs and the change amount ΔT of the motor torque value T. This can set the localization of the synthetic sound signals so that the sound image of the low frequency components of the synthetic sounds output from the front speakers 20A and the rear speakers 20B is located toward the wheel where the ground load is increasing.

It should be noted that the sound pressure levels of the low frequency components are adjusted depending on which numerical range of three divided numerical ranges includes the pitch rate ωp and the roll rate ωr or the steering angular speed ωs and the change amount ΔT of the motor torque value T in the examples illustrated in FIGS. 8A and 8B, but the sound pressure levels of the low frequency components may be continuously adjusted according to the pitch rate ωp and the roll rate ωr or the steering angular speed ωs and the change amount ΔT of the motor torque value T.

In addition, in the equalizing processing according to the first embodiment, the controller 10 (sound control unit 11) reduces the sound pressure levels of the high frequency components of the synthetic sound signals $S_{SRL}$ and $S_{SRR}$ of the channels for the left and right rear speakers 20B by 40 dB. As illustrated in FIGS. 6A, 6B, 6C, 6D and 6E and 7A, 7B, 7C, 7D and 7E, the sound pressure levels of the synthetic sounds are set to approximately 80 dB at the maximum, so the sound pressure levels of the high frequency components of the channels for the rear speakers 20B are smaller than 40 dB by reducing the sound pressure levels by 40 dB in the equalizing processing. That is, the driver cannot consciously hear the high frequency components of the sounds output from the rear speakers 20B. This sets the localization so that the sound image position of the high frequency components of the synthetic sounds output from the front speakers 20A and the rear speakers 20B is located in front of the driver.

Next, the controller 10 (sound control unit 11) performs gain adjustment processing on the synthetic sound signal $S_{SFL}$ for the channel for the left front speaker 20A (FrL), the synthetic sound signal $S_{SFR}$ for the channel for the right front speaker 20A (FrR), the synthetic sound signal $S_{SRL}$ for the channel for the left rear speaker 20B (RrL), and the synthetic sound signal $S_{SRR}$ for the channel for the right rear speakers 20B (RrR) and adjusts the amplitude of the entire synthetic sound of the channels (step S7).

Then, the speakers 20A and 20B receive the synthetic sound signals, amplify the received signals, and output the amplified signals as the synthetic sounds toward the driver (step S8).

Figure 9:
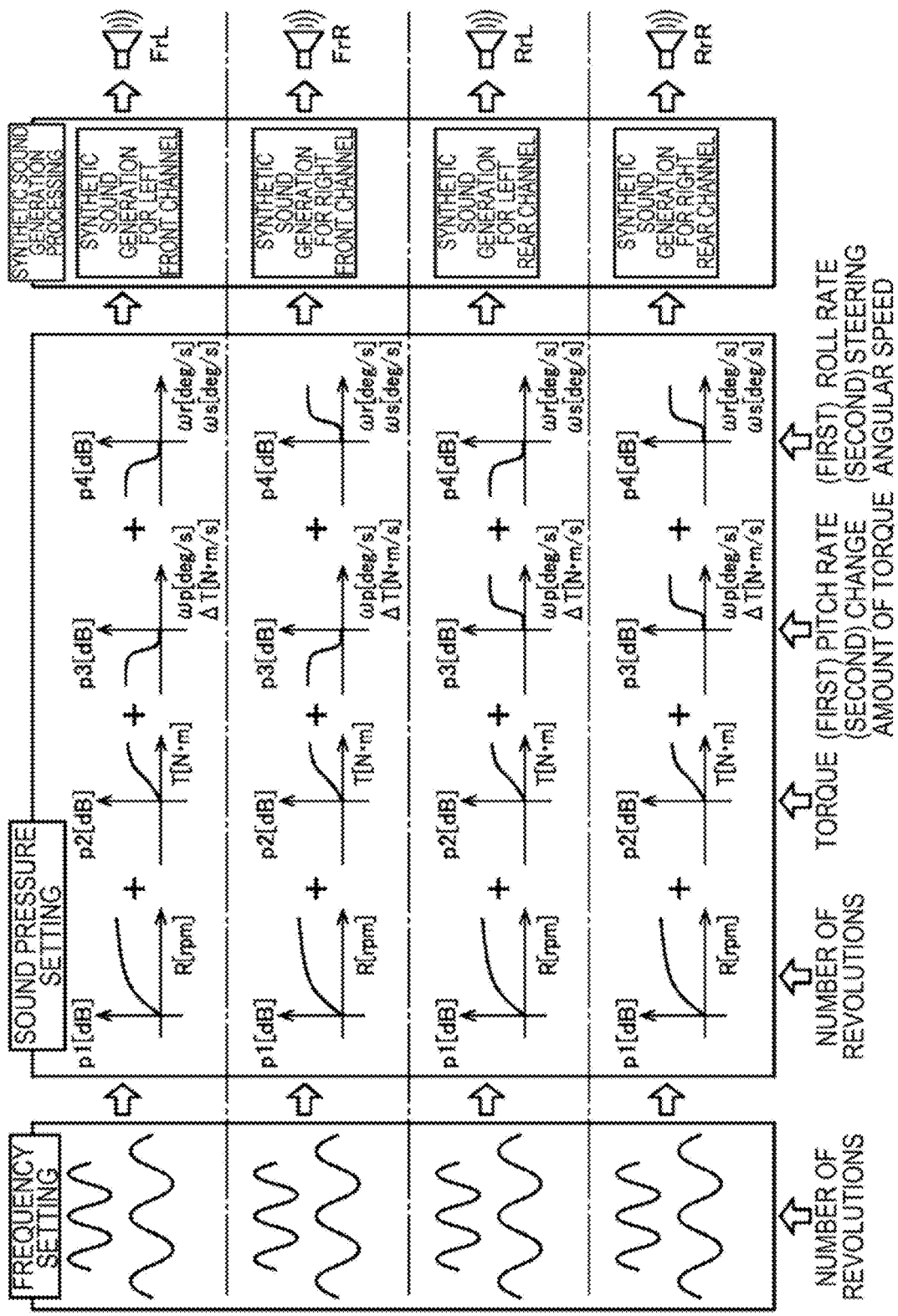
FIG. 9 is an explanatory diagram illustrating a flow of sound generation processing of a vehicle sound generation device according to a second embodiment of the present disclosure.

Next, a flow of the sound generation processing by the vehicle sound generation device 1 according to a second embodiment will be described with reference to FIG. 9. FIG. 9 is an explanatory diagram illustrating a flow of the sound generation processing by the vehicle sound generation device 1 according to the second embodiment.

As illustrated in FIG. 9, the vehicle sound generation device 1 according to the second embodiment sets one or more frequencies for the channel for the left front speaker 20A (FrL), the channel for the right front speaker 20A (FrR), the channel for the left rear speaker 20B (RrL), and the channel for the right rear speaker 20B (RrR) in the sound generation processing (frequency settings). The frequencies are set so as to be proportional to the number of revolutions R of the motor. That is, the frequencies become higher as the number of revolutions R of the motor increases.

The frequency of the channels for the rear speakers 20B includes a lower frequency of the plurality of frequencies of the channels for the front speakers 20A. For example, the lowest frequency of the plurality of frequencies of the channels for the front speakers 20A is set as the frequency of the channels for the rear speakers 20B. Alternatively, a frequency lower than the frequencies for the front speakers 20A may be set. As a result, only the front speakers 20A output the high frequency component of the synthetic sound and the localization is set so that the sound image position of the high frequency component is located in front of the driver.

Next, the vehicle sound generation device 1 sets the sound pressure levels of the frequencies set for the channels for the left and right front speakers 20A and the channels for the left and right rear speakers 20B based on the number of revolutions R of the motor, the motor torque value T, the pitch rate ωp or the change amount ΔT of the motor torque value T, and the roll rate ωr or the steering angular speed ωs (sound pressure setting). Specifically, as in the first embodiment, the vehicle sound generation device 1 sets the first sound pressure level p1 for each of the frequencies that corresponds to the number of revolutions R of the motor with reference to the first sound pressure level setting map and sets the second sound pressure level p2 for each of the frequencies that corresponds to the motor torque value T with reference to the second sound pressure level setting map. The first sound pressure level setting map and the second sound pressure level setting map are common to the channels.

Furthermore, the vehicle sound generation device 1 sets the third sound pressure level p3 corresponding to the pitch rate ωp or the change amount ΔT of the motor torque value T for each of the frequencies with reference to a third sound pressure level setting map and sets the fourth sound pressure level p4 corresponding to the roll rate ωr or the steering angular speed ωs for each of the frequencies with reference to a fourth sound pressure level setting map. In the third sound pressure level map and the fourth sound pressure level map, the parameters (the pitch rate ωp or the change amount ΔT of the motor torque value T, and the roll rate ωr or the steering angular speed ωs) of each of the maps are set to increase the sound pressure level when these parameters are larger than a predetermined value. The third sound pressure level setting map and the fourth sound pressure level setting map for the channels for the left and right front speakers 20A are different from the third sound pressure level setting map and the fourth sound pressure level setting map for the channels for the left and right rear speakers 20B. Accordingly, when the load movement in a specific direction occurs in the vehicle 2, the localization of the synthetic sound signals can be set to increase the sound pressure level of the low frequency component of the synthetic sound output from the speaker located toward the wheel where the ground load is increasing, that is, so as to move the sound image position of the low frequency component of the synthetic sound toward the wheel where the ground load is increasing.

Then, the sum of the first sound pressure level p1 to the fourth sound pressure level p4 set as described above is used as the sound pressure levels of the sounds with the frequencies of the channels. It should be noted that one first sound pressure level setting map, one second sound pressure level setting map, one third sound pressure level setting map, and one fourth sound pressure level setting map are illustrated for each of the channels in FIG. 9, but, in reality, the first sound pressure level setting map to the fourth sound pressure level setting map are prepared in advance for each of the frequencies of each of the channels and stored in the storage unit 12.

Next, the vehicle sound generation device 1 generates the synthetic sound signal $S_{SFL}$ of the channel for the left front speaker 20A (FrL), the synthetic sound signal $S_{SFR}$ of the channel for the right front speaker 20A (FrR), the synthetic sound signal $S_{SRL}$ of the channel for the left rear speaker 20B (RrL), and the synthetic sound signal $S_{SRR}$ of the channel for the right rear speaker 20B (RrR) by synthesizing the sounds with the frequencies of the channels for which the sound pressures have been set (synthetic sound generation processing). Since the frequency set in the frequency setting and the sound pressure level set in the sound pressure setting are different between the channels in the second embodiment, synthetic sound signals to be generated are different between the channels.

Then, the vehicle sound generation device 1 outputs the synthetic sound signal $S_{SFL}$ of the channel for the left front speaker 20A (FrL), the synthetic sound signal $S_{SFR}$ of the channel for the right front speaker 20A (FrR), the synthetic sound signal $S_{SRL}$ of the channel for the left rear speaker 20B (RrL), and the synthetic sound signal $S_{SRR}$ of the channel for the right rear speaker 20B (RrR) to the corresponding speakers. The speakers 20A and 20B receive the synthetic sound signals, amplify the received signals, and outputs the amplified signals as the synthetic sounds toward the driver.

Next, the sound generation processing by the vehicle sound generation device 1 according to the second embodiment will be described with reference to FIGS. 10 to 12. FIG. 10 is a flowchart illustrating the sound generation processing according to the second embodiment, FIGS. 11A, 11B, 11C and 11D are an example of the third sound pressure level setting map illustrating the relationship between the sound pressure level and the change amount per unit time of the physical quantity correlated with an driving operation according to the second embodiment, and FIGS. 12A, 12B, 12C and 12D are another example of the sound pressure level setting map illustrating the relationship between the change amount per unit time of the physical quantity and the sound pressure level correlated with a driving operation according to the second embodiment.

The vehicle sound generation device 1 repeatedly executes the sound generation processing illustrated in FIG. 10 at predetermined time intervals (for example, 10 ms intervals).

When the sound generation processing starts, the controller 10 first acquires sensor information from the sensor group 30 via the in-vehicle communication line (step S11). As described above, the controller 10 acquires at least the number of revolutions R of the motor, the motor torque value T, the steering angular speed ωs, the pitch rate ωp, and the roll rate ωr.

Next, the controller 10 (sound control unit 11) performs frequency setting processing (step S12). In the frequency setting processing, the controller 10 sets a plurality of frequencies for the channels for left and right front speakers 20A based on the number of revolutions R of the motor and sets one or more frequencies for the channels for the left and right rear speakers 20B. For example, five frequencies f1 to f5 are set for the channels for the front speakers 20A as in the first embodiment. In contrast, the frequency f1 is set for the channels for the rear speakers 20B.

Next, the controller 10 (sound control unit 11) sets the first sound pressure level p1 of each of the frequencies set for the channels based on the number of revolutions R of the motor with reference to the first sound pressure level setting map (map M1) stored in the storage unit 12 (step S13).

The first sound pressure level p1 of the channels for the front speakers 20A is set in the same manner as the first embodiment. That is, as illustrated in FIGS. 6A, 6B, 6C, 6D and 6E, the controller 10 sets the first sound pressure level p1 of each of the channels for the front speakers 20A based on the map M1 that defines the first sound pressure level p1 (dB) corresponding to the number of revolutions R (rpm) of the motor for each of the five the frequencies f1 to f5.

In addition, the first sound pressure level p1 of each of the channels for the rear speakers 20B is set based on the map M1 that defines the first sound pressure level p1 (dB) corresponding to the number of revolutions R (rpm) of the motor for one frequency f1. This map M1 can be the same as the map M1 (FIG. 6A) used to set the first sound pressure level p1 for the frequency f1 of each of the channels for the front speakers 20A.

Next, the controller 10 (sound control unit 11) sets the second sound pressure level p2 of each of the frequencies set for the channels for the front speakers 20A based on the motor torque value T with reference to the second sound pressure level setting map (map M2) stored in the storage unit 12 and the second sound pressure level p2 of each of the frequencies set for the channels for the rear speakers 20B (step S14).

The second sound pressure level p2 of each of the channels for the front speakers 20A is set in the same manner as the first embodiment. That is, as illustrated in FIGS. 7A, 7B, 7C, 7D and 7E, the second sound pressure level p2 (dB) of each of the channels for the front speakers 20A is set based on the map M2 that defines the second sound pressure level p2 corresponding to the motor torque value T (N·m) for each of the five frequencies f1 to f5.

In addition, the second sound pressure level p2 of each of the channels for the rear speakers 20B is set based on the map M2 that defines the second sound pressure level p2 (dB) corresponding to the motor torque value T (N·m) for one frequency f1. This map M2 can be the same as the map M2 (FIG. 7A) used to set the second sound pressure level p2 for the frequency f1 of the front channels.

Next, the controller 10 (sound control unit 11) sets the third sound pressure level p3 of each of the frequencies set for the channels based on the pitch rate ωp or the change amount ΔT of the motor torque value T with reference to the third sound pressure level setting map (map M3) stored in the storage unit 12 (step S15). The third sound pressure level p3 is set based on the map M3 that defines the third sound pressure level p3 (dB) corresponding to the pitch rate ωp for one frequency f1 as illustrated in FIGS. 11A and 11B or set based on the map M3 that defines the third sound pressure level p3 (dB) corresponding to the change amount ΔT of the motor torque value T for one frequency f1 as illustrated in FIGS. 11C and 11D.

Figure 11A:
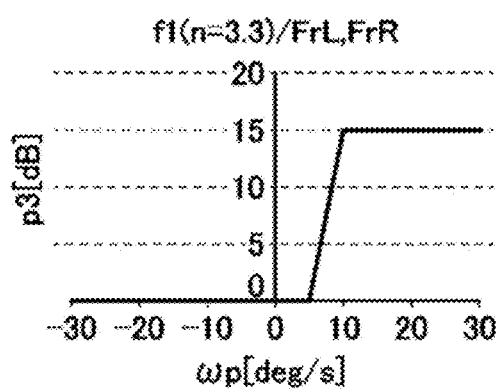
FIGS. 11A, 11B, 11C and 11D are a third sound pressure level setting map illustrating the relationship between the sound pressure level and the change amount per unit time of the physical quantity correlated with a driving operation in a front-rear direction in the second embodiment of the present disclosure.
Figure 11B:
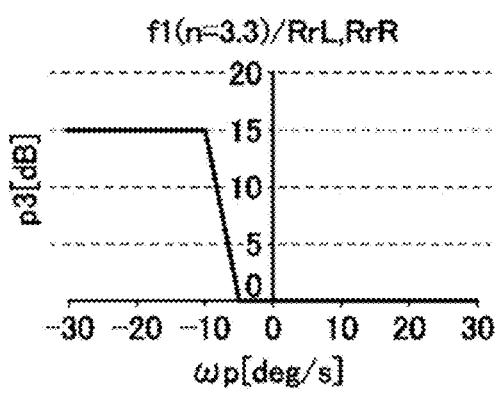

As illustrated in FIGS. 11A and 11B, in the map M3 that defines the third sound pressure level p3 (dB) corresponding to the pitch rate ωp, the third sound pressure level p3 of each of the channels for left and right front speakers 20A (FrL and FrR) is set to increase by 15 dB in a stepped manner when the pitch rate ωp is larger than a predetermined value (approximately 5 deg/s in FIG. 11A). Accordingly, since the sound pressure levels of the low frequency components of the synthetic sounds output from the left and right front speakers 20A increase when the pitch rate ωp toward the front of the vehicle 2 exceeds the predetermined value and the load movement from the rear to the front of the vehicle 2 occurs, the localization is set so that the sound image position of the low frequency components of the synthetic sounds is located in front of the driver.

In addition, when the absolute value of the pitch rate ωp is equal to or less than a predetermined value (−5 deg/s≤ωp≤5 deg/s in FIGS. 11A and 11B), the third sound pressure level p3 is set to remain 0 and not increase. Furthermore, when the pitch rate ωp is smaller than a predetermined value (approximately −5 deg/s in FIG. 11B), the third sound pressure level p3 of each of the channels for the left and right rear speakers 20B (RrL and RrR) is set to increase by 15 dB in a stepped manner. Accordingly, since the sound pressure levels of the low frequency components of the synthetic sounds output from the left and right rear speakers 20B increase when the pitch rate ωp toward the rear of the vehicle 2 exceeds the predetermined value and the load movement from the front to the rear of the vehicle 2 occurs, the localization is set so that the sound image position of the low frequency components of the synthetic sounds is located behind the driver.

Figure 11C:
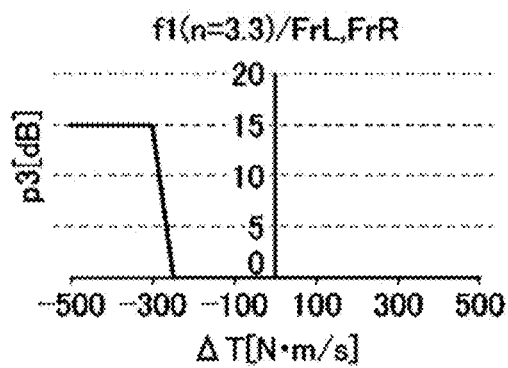
Figure 11D:
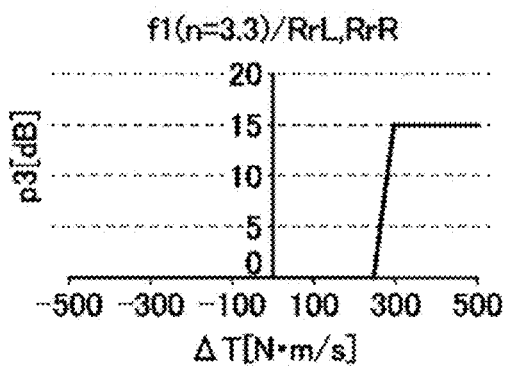

In addition, in other examples illustrated in FIGS. 11C and 11D as well, the third sound pressure level p3 (dB) is specified so that the sound pressure levels of the low frequency components of the synthetic sounds output from the left and right front speakers 20A increase when the change amount ΔT of the motor torque value T is smaller than a negative predetermined value (approximately −250 N·m/s) and the load movement from the rear to the front of the vehicle 2 occurs, and the sound pressure levels of the low frequency components of the synthetic sounds output from the left and right rear speakers 20B increase when the change amount ΔT of the motor torque value T is larger than a predetermined value (approximately 250 N·m/s) and the load movement from the front to the rear of the vehicle 2 occurs.

Next, the controller 10 (sound control unit 11) sets the fourth sound pressure level p4 of each of the frequencies set for the channels based on the roll rate ωr or the steering angular speed ωs with reference to the fourth sound pressure level setting map (map M4) stored in the storage unit 12 (step S16). The fourth sound pressure level p4 is set based on the map M4 that defines the fourth sound pressure level p4 (dB) corresponding to the roll rate ωr for one frequency f1 as illustrated in FIGS. 12A and 12B or set based on the map M4 that defines the fourth sound pressure level p4 (dB) corresponding to the steering angular speed ωs for one frequency f1 as illustrated in FIGS. 12C and 12D.

Figure 12A:
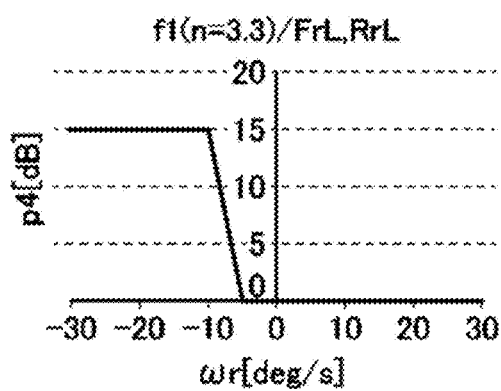
FIGS. 12A, 12B, 12C and 12D area fourth sound pressure level setting map illustrating the relationship between the change amount per unit time of the physical quantity correlated with a driving operation in a left-right direction and the sound pressure level in the second embodiment of the present disclosure.
Figure 12B:
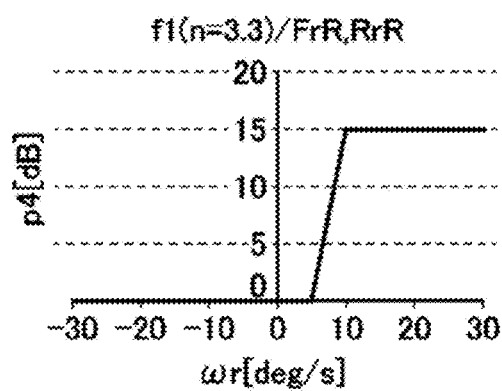

As illustrated in FIGS. 12A and 12B, in the map M4 that defines the fourth sound pressure level p4 (dB) corresponding to the roll rate ωr, the fourth sound pressure level p4 of each of the channels for left front speaker 20A (FrL) and the left rear speaker 20B (RrL) is set to increase by 15 dB in a stepped manner when the roll rate ωr is smaller than a negative predetermined value (approximately −5 deg/s in FIG. 12A). Accordingly, since the sound pressure levels of the low frequency components of the synthetic sounds output from the left front speaker 20A and the left rear speaker 20B increase when the roll rate ωr toward the left side of the vehicle 2 exceeds a predetermined value and the load movement from right to left of the vehicle 2 occurs, the localization is set so that the sound image position of the low frequency components of the synthetic sounds is located on the left side of the driver.

In addition, when the absolute value of the roll rate ωr is equal to or less than a predetermined value (−5 deg/s≤ωr≤5 deg/s in FIGS. 12A and 12B), the fourth sound pressure level p4 is set to remain 0 and not increase. Furthermore, when the roll rate ωr is larger than the predetermined value (approximately 5 deg/s in FIG. 12B), the fourth sound pressure level p4 of each of the channels for the right front speaker 20A (FrR) and the right rear speaker 20B (RrR) is set to increase by 15 dB in a stepped manner. Accordingly, since the sound pressure levels of the low frequency components of the synthetic sounds output from the right front speaker 20A and the right rear speaker 20B increase when the roll rate ωr toward the right side of the vehicle 2 exceeds the predetermined value and the load movement from the left to the right of the vehicle 2 occurs, the localization is set so that the sound image position of the low frequency components of the synthetic sounds is located on the right side of the driver.

Figure 12C:
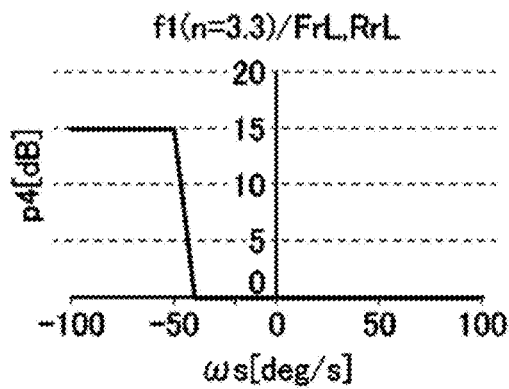
Figure 12D:
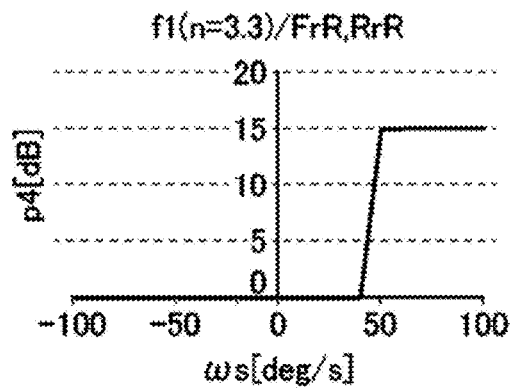

In addition, in other examples illustrated in FIGS. 12C and 12D as well, the fourth sound pressure level p4 (dB) is specified so that the sound pressure levels of the low frequency components of the synthetic sounds output from the left front speaker 20A and the right rear speaker 20B increase when the steering angular speed ωs is smaller than a negative predetermined value (approximately −40 deg/s) and the load movement from the right to the left of the vehicle 2 occurs, and the sound pressure levels of the low frequency components of the synthetic sounds output from the right front speaker 20A and the right rear speakers 20B increase when the steering angular speed ωs is larger than the predetermined value (approximately 40 deg/s) and the load movement from the left to the right of the vehicle 2 occurs.

Next, the controller 10 (sound control unit 11) generates the synthetic sound signal $S_{SFL}$ of the channel for the left front speaker 20A (FrL), the synthetic sound signal $S_{SFR}$ of the channel for the right front speaker 20A (FrR), the synthetic sound signal $S_{SRL}$ of the channel for the left rear speaker 20B (RrL), and the synthetic sound signal $S_{SRR}$ of the channel for the right rear speaker 20B (RrR) by setting the sum of the first sound pressure levels p1, the second sound pressure levels p2, the third sound pressure levels p3, and the fourth sound pressure levels p4 of the sounds with the frequencies as the sound pressure levels of the sounds with the frequencies of the channels and synthesizing the sounds with frequencies for which the sound pressures have been set (step S17).

Then, the left and right front speakers 20A and the left and right rear speakers 20B receive the synthetic sound signals, amplify the received signals, and output the amplified signals as the synthetic sounds toward the driver (step S18).

Next, the operation and advantage of the vehicle sound generation device 1 according to the embodiment will be described.

The vehicle sound generation device 1 according to the embodiment is mounted in the vehicle 2, generates the sound signals representing the sounds, and includes the controller 10 (sound control unit 11) that sets the localization of the sounds and the left and right front speakers 20A and the left and right rear speakers 20B that output sounds corresponding to the sound signals for which the localization has been set by the controller 10. The controller 10 (sound control unit 11) sets the localization of the sounds based on the change amounts per unit time (for example, the pitch rate, the torque change amount, the forward and backward jerks, and the like for the front-rear direction of the vehicle 2 or the roll rate, the steering angular speed, the left and right jerks, and the like for the left-right direction of the vehicle 2) of the physical quantities correlated with a driving operation by the driver so that the sound image of at least a part (low frequency component) of the frequency components of the sounds is located toward the wheel where the ground load is increasing according to the driving operation by the driver of the vehicle 2.

In the embodiment, the sound image position of the at least part of the frequency components of the sounds moved toward the wheel where the ground load is increasing according to a driving operation by the driver based on the change amount per unit time of the physical quantity correlated with the driving operation. Accordingly, when the load movement of the vehicle 2 occurs according to the driving operation, the driver can easily perceive the load movement due to the movement of the sound image position of the sounds. That is, it is possible to help the driver to perceive changes in the force applied to the vehicle and thereby improve the accuracy of the driving operation.

In addition, in the embodiment, the controller 10 sets the localization of the sounds so that the sound image position is not biased in a specific direction with respect to the driver when the change amount per unit time of the physical quantity correlated with the driving operation is equal to or less than a predetermined value.

In the embodiment, since this structure does not bias the sound image position in a specific direction with respect to the driver when, for example, the driver holds the steering wheel and the accelerator pedal in a constant state and load movement in a specific direction does not occur or load movement is sufficiently small even if it occurs in the vehicle 2, the driver can more easily perceive the movement of the sound image position if load movement occurs and can easily recognize that the sounds output from the left and right front speakers 20A and the rear speakers 20B are the sounds regarding the load movement of the vehicle 2.

In addition, in the embodiment, the controller 10 generates synthetic sound signals including a plurality of frequencies and sets the localization of the sounds so that the sound image of the frequency component (high frequency component) other than at least part (low frequency component) of frequency components is located toward the electric motor 3 (rotational power source).

In the embodiment, this structure enables the driver to easily distinguish the sound that reports the state of the electric motor 3 (rotational power source) from the sound regarding the load movement of the vehicle 2 based on the change in the direction of arrival of the sounds.

In addition, in the embodiment, at least a part of frequency components for which the localization is set based on the change amount per unit time of the physical quantity correlated with a driving operation by the driver is lower than the frequency component other than the at least a part of frequency components.

This structure moves the sound image position of a low-pitch sound that gives weight and strength toward the wheel where the ground load is increasing in the embodiment, so the driver can more easily perceive the movement of the load of the vehicle 2.

In addition, in the embodiment, the physical quantity correlated with a driving operation includes the motor torque value T of the electric motor 3 (rotational power source) and the controller 10 sets the localization of the sound in the front-rear direction of the vehicle 2 based on the change amount ΔT per unit time of the motor torque value T.

In the embodiment, since this structure performs control using the acceleration of the vehicle 2 and the motor torque value T that changes before the suspension stroke, the driver can perceive the movement of the sound image position of a low-pitch sound before the behavior in the front-rear direction of the vehicle 2 changes, thereby helping the driver to predict the behavior change in the front-rear direction of the vehicle 2.

In addition, in the embodiment, the physical quantity correlated with a driving operation includes the steering angle, and the controller 10 sets the localization of the sound in the left-right direction of the vehicle 2 based on the steering angular speed ωs.

In the embodiment, since this structure performs control using the acceleration of the vehicle 2 and the steering angle that changes before the suspension stroke, the driver can perceive the movement of the sound image position of a low-pitch sound before the behavior change in the left-right direction of the vehicle 2 occurs, thereby helping the driver to predict the behavior change in the left-right direction of the vehicle 2.

DESCRIPTION OF REFERENCE SIGNS AND NUMERALS

1: vehicle sound generation device
2: vehicle
3: electric motor
10: controller
11: sound control unit
12: storage unit
20A: front speaker
20B: rear speaker
30: sensor group
31: RPM sensor
32: PCM
33: steering angular sensor
34: motion sensor
M1: first sound pressure level setting map
M2: second sound pressure level setting map
M3: third sound pressure level setting map
M4: fourth sound pressure level setting map

The invention claimed is:

1. A vehicle sound generation device mounted in a vehicle, comprising:
sound circuitry that generates a sound signal representing a sound and sets localization of the sound; and
a sound outputter that outputs a sound corresponding to the sound signal for which localization is set by the sound circuitry,
wherein the sound circuitry sets the localization of the sound based on a change amount per unit time of a physical quantity correlated with a driving operation by a driver of the vehicle so that a sound image of at least a part of frequency components of the sound is located toward a wheel where a ground load increases according to the driving operation.

2. The vehicle sound generation device according to claim 1,
wherein the sound circuitry sets the localization of the sound so that a position of the sound image is not biased in a particular direction with respect to the driver when the change amount per unit time of the physical quantity is equal to or less than a predetermined value.

3. The vehicle sound generation device according to claim 2,
wherein the vehicle travels using a rotational power source including an electric motor or an engine, and
the sound circuitry generates a synthetic sound signal including a plurality of frequencies and sets the localization of the sound so that a sound image of a frequency component other than the at least a part of frequency components is located toward the rotational power source.

4. The vehicle sound generation device according to claim 3,
wherein the at least a part of frequency components is lower than the frequency component other than the at least a part of frequency components.

5. The vehicle sound generation device according to claim 4,
wherein
the physical quantity correlated with the driving operation includes an output torque of the rotational power source, and
the sound circuitry sets the localization of the sound in a front-rear direction of the vehicle based on a change amount per unit time of the output torque.

6. The vehicle sound generation device according to claim 5,
wherein the physical quantity correlated with the driving operation includes a steering angle of the vehicle, and
the sound circuitry sets the localization of the sound in a left-right direction of the vehicle based on a change amount per unit time of the steering angle.

7. The vehicle sound generation device according to claim 3,
wherein
the physical quantity correlated with the driving operation includes an output torque of the rotational power source, and
the sound circuitry sets the localization of the sound in a front-rear direction of the vehicle based on a change amount per unit time of the output torque.

8. The vehicle sound generation device according to claim 2,
wherein the vehicle travels using a rotational power source including an electric motor or an engine,
the physical quantity correlated with the driving operation includes an output torque of the rotational power source, and
the sound circuitry sets the localization of the sound in a front-rear direction of the vehicle based on a change amount per unit time of the output torque.

9. The vehicle sound generation device according to claim 8,
wherein the physical quantity correlated with the driving operation includes a steering angle of the vehicle, and
the sound circuitry sets the localization of the sound in a left-right direction of the vehicle based on a change amount per unit time of the steering angle.

10. The vehicle sound generation device according to claim 2,
wherein the physical quantity correlated with the driving operation includes a steering angle of the vehicle, and
the sound circuitry sets the localization of the sound in a left-right direction of the vehicle based on a change amount per unit time of the steering angle.

11. The vehicle sound generation device according to claim 1,
wherein the vehicle travels using a rotational power source including an electric motor or an engine, and
the sound circuitry generates a synthetic sound signal including a plurality of frequencies and sets the localization of the sound so that a sound image of a frequency component other than the at least a part of frequency components is located toward the rotational power source.

12. The vehicle sound generation device according to claim 11,
wherein the at least a part of frequency components is lower than the frequency component other than the at least a part of frequency components.

13. The vehicle sound generation device according to claim 12,
wherein
the physical quantity correlated with the driving operation includes an output torque of the rotational power source, and
the sound circuitry sets the localization of the sound in a front-rear direction of the vehicle based on a change amount per unit time of the output torque.

14. The vehicle sound generation device according to claim 12,
wherein the physical quantity correlated with the driving operation includes a steering angle of the vehicle, and
the sound circuitry sets the localization of the sound in a left-right direction of the vehicle based on a change amount per unit time of the steering angle.

15. The vehicle sound generation device according to claim 11,
wherein
the physical quantity correlated with the driving operation includes an output torque of the rotational power source, and
the sound circuitry sets the localization of the sound in a front-rear direction of the vehicle based on a change amount per unit time of the output torque.

16. The vehicle sound generation device according to claim 11,
wherein the physical quantity correlated with the driving operation includes a steering angle of the vehicle, and
the sound circuitry sets the localization of the sound in a left-right direction of the vehicle based on a change amount per unit time of the steering angle.

17. The vehicle sound generation device according to claim 1,
wherein the vehicle travels using a rotational power source including an electric motor or an engine,
the physical quantity correlated with the driving operation includes an output torque of the rotational power source, and
the sound circuitry sets the localization of the sound in a front-rear direction of the vehicle based on a change amount per unit time of the output torque.

18. The vehicle sound generation device according to claim 17,
wherein the physical quantity correlated with the driving operation includes a steering angle of the vehicle, and
the sound circuitry sets the localization of the sound in a left-right direction of the vehicle based on a change amount per unit time of the steering angle.

19. The vehicle sound generation device according to claim 1,
wherein the physical quantity correlated with the driving operation includes a steering angle of the vehicle, and
the sound circuitry sets the localization of the sound in a left-right direction of the vehicle based on a change amount per unit time of the steering angle.

20. A vehicle sound generation method for a vehicle, the method, comprising:
generating a sound signal representing a sound and sets localization of the sound; and
outputting a sound corresponding to the sound signal for which localization is set;
setting the localization of the sound based on a change amount per unit time of a physical quantity correlated with a driving operation by a driver of the vehicle so that a sound image of at least a part of frequency components of the sound is located toward a wheel where a ground load increases according to the driving operation,
wherein the physical quantity correlated with the driving operation includes a steering angle of the vehicle; and
setting the localization of the sound in a left-right direction of the vehicle based on a change amount per unit time of the steering angle.

* * * * *